United States Patent Office 3,696,040
Patented Oct. 3, 1972

3,696,040
COMPOSITION FOR REMOVAL OF CALCIUM
SULFATE DEPOSITS
Frank H. Mayo, Breauxbridge, La., assignor to
Champion Chemicals, Inc., Houston, Tex.
No Drawing. Continuation-in-part of abandoned application Ser. No. 775,129, Nov. 12, 1968. This application Jan. 16, 1970, Ser. No. 3,486
Int. Cl. C02b 5/06
U.S. Cl. 252—87                              7 Claims

ABSTRACT OF THE DISCLOSURE

A composition of matter suitable for removal of mineral deposits such as gypsum and the like comprising a salt formed from a base and an organic acid having from 2 to 12 carbon atoms inclusive and water. In the preferred case, the acid is one having a dissociation constant of $>1.0\times10^{-5}$ and may be for example glycolic acid. The composition may further contain an acid or a base and a surfactant.

CROSS REFERENCE TO RELATED APPLICATION

This is a continuation-in-part of copending application Ser. No. 775,129, filed Nov. 12, 1968, now abandoned.

BACKGROUND OF THE INVENTION

This invention relates to compositions useful for the removal of mineral deposits such as gypsum from the equipment associated with oil and gas wells and from the wells themselves, and from industrial equipment such as boilers, cooling towers and the like.

Numerous attempts have been made in the past to devise methods and compositions or combinations thereof for the removal of gypsum deposits from oil wells. For example, the use of potassium hydroxide in aqueous solutions has been suggested but has been found to require an excessive amount of time for adequate removal of the deposit. Furthermore, the result of such treatment is a fluffy precipitate of calcium hydroxide which still must be washed from a well or the like, either with hydrochloric or other mineral acid, after which it may be desirable to water wash in order to remove all acid from the well. A similar treatment with sodium hydroxide has been proposed with similar results. Another proposal has involved the use of a base in aqueous solution in combination with an electric current. All of the foregoing obviously require considerable periods of time and are expensive.

One other proposal has to do with the introduction into the well or other locality in which such scale is to be treated of an aqueous alkaline metal salt solution, such as an aqueous solution of an alkaline metal acid salt. Such treatment has been found to have some advantages over those previously described above, but still requires an undesirable amount of time, even when, as has been suggested, it is used in the presence of a wetting agent. Furthermore, the product of such treatment, while possibly soluble, is formed as a precipitate which must then be dissolved with a separate reagent, or, in the case of a well, bailed out mechanically.

SUMMARY OF THE INVENTION

It is therefore an object of this invention to provide a composition of matter and a method for removing hardened calcium sulfate formations more quickly than heretofore possible.

Another object is to provide such a composition and method which will remove such deposits in solution rather than as a precipitate, the solution taking place after the apparent softening of the original deposit.

Another object is to provide a composition and method for removal of calcium sulfate scaled formation by only the single act of subjecting it to the action of such a composition of matter.

It has been discovered that the base salts of certain acids as hereinafter set forth, particularly in the presence of one or more of certain additional acids or bases as also hereinafter set forth, will produce not only the softening and chemical alteration of the gypsum deposits, but will, especially under the action of such additional acid or base, cause such action to take place much more rapidly than by previously known compositions, and will produce a product which will be directely dissolved into the composition used in treating the formation in the first place. All that is thereafter necessary is to wash the well or other locus from which the formation has been removed, so as to remove therefrom the residue of the treating composition together with the product of the treatment dissolved therein, and possibly with part of the product of such treatment in the form of disintegrated formation easily removable when washing out the treating composition.

In accordance with this invention, an appropriate salt is first formed by reacting a base and an organic acid having from 2 to 12 carbon atoms inclusive, the salt thereformed being present in the composition in an amount of from about 5 to about 85% by weight and water being present in an amount of from about 95 to about 15% by weight. The salt, thus formed, can be used as is or as pointed out above preferably in the presence of a base or acid catalyst. In certain cases, a suitable wetting agent such as the ethylene oxide adduct of dinonylphenol can be added to aid in wetting the surface of the formation to be treated. Such wetting agents or surfactants are generally employed when an oily formation is to be treated.

DESCRIPTION OF THE PREFERRED EMBODIMENTS

The basic scale remover composition of the present invention comprises (1) a salt of certain acids and bases and (2) water. Generally speaking, the salt will be of an organic acid having from two to twelve carbon atoms and preferably two to six carbon atoms. It has been found that when a salt prepared from an acid having greater than six carbon atoms is used, the activity is increased by the addition of a solubilizing agent which increases the solubility of the salt in the formulation. Numerous saturated and unsaturated carboxylic acids falling within the above specified range of carbon atoms can be employed. Both mono-, di- and tribasic acids are suitable for use. Preferably, the organic acid chosen should be one having a dissociation constant greater than $1.0 \times 10^{-5}$. Acids having such dissociation constants have been found to be especially effective. It is especially preferred that the acid chosen be a hydroxy acid. As examples of suitable acids useful in preparing the salts contemplated by the present invention can be mentioned, acetic acid, adipic acid, acrylic acid, butyric acid, citric acid, chloroacetic acid, 2,4-dihydroxy benzoic acid, dithioloxalic acid, formic acid, parahydroxy benzoic acid, lactic acid, lauric acid, oxalic acid, terephthalic acid, and the like. An especially desirable composition is obtained when the salt used is prepared from glycolic acid.

Practically any commonly known base can be employed to prepare the salts useful in the compositions of the present invention. Suitable bases include the alkali metal hydroxides such as sodium, potassium and lithium hydroxide; ammonium hydroxide; amines having generally from one to ten carbon atoms such as monomethylamine, monoethylamine, propylamine, butylamine, dimethylamine, trimethylamine, ethylene diamine, ethanolamine, diethanolamine, aniline, the toluidines and the like. Especially preferred as a base, primarily due to the superior solubility characteristics imparted to salts prepared therefrom, is potassium hydroxide. It has been found that salts prepared from potassium hydroxide and particularly the glycolic acid salt of potassium hydroxide produce compositions of extreme effectiveness in dissolving and disintegrating mineral deposits such as gyp scale and the like.

Generally speaking, the compositions useful herein will contain from about 5 to about 85% by weight of the salt and from about 95 to about 15% by weight water. Preferably, however, the compositions will contain from about 5 to about 50% by weight of the salt and from about 95 to about 50% by weight of water. It is to be understood that salts of two or more of the above identified acids and bases can be used together as well as a single salt.

Especially desirable compositions for the removal of mineral deposits are obtained when the salt and water compositions desicribed above contain, in addition, from about 1% to about 30% of a base catalyst particularly an alkali metal hydroxide or from about 1% to about 15% by weight of an acid catalyst. The acid catalyst can virtually be any organic or inorganic acid known. It can, for example, be the acid from which the salt was prepared. Preferably, however, the acid catalyst will be one selected from the group consisting of sulfamic acid, hydrochloric acid, o-nitrobenzoic acid, phosphoric acid, sulfanilic acid, sulfuric acid, sulfurus acid and mixtures thereof. Compositions of superior scale removing ability are obtained when the salt and water compositions set forth contain either potassium hydroxide as a base catalyst or sulfamic acid as an acid catalyst.

It frequently happens that the gypsum or other mineral deposits sought to be removed occur in ears containing relatively high concentrations of oil such that it is difficult to "wet" the mineral deposits with the scale dissolving compositions herein. To circumvent this problem, a surfactant or emulsifier can be incorporated into the compositions to aid in wetting the mineral deposits. Any of the well-known surfactants, wetting agents or emulsifiers can be employed. Examples include the ethylene oxide adducts of alkyl phenols such as the ethylene oxide adduct of dinonyl phenol, octyl phenol, etc.; alkyl sulfates such as sodium lauryl sulfate; alkyl benzene sulfonates and the like. When a surface active agent is employed, it need be present only in an amount effective to wet the formation sought to be dissolved. Generally speaking, however, when a surfactant or surface active agent is employed, it will be present in amounts ranging from 0.1 to about 3% by weight.

The mineral-dissolving compositions disclosed herein can be used as is or they can be diluted with water. When solubility is a problem, it is often found desirable to dilute the composition which facilitates the pumping thereof and the rate of disintegration of the mineral deposits.

To demonstrate the effectiveness of the composition in the removal of gypsum deposits from oil wells and associated equipment, the following non-limiting examples are given. In all cases the composition employed contained, by weight, 48.5% potassium glycolate, 47.2% water, 3.4% sulfamic acid and 0.9% of the ethylene oxide adduct of dinonyl phenol containing 150 moles of ethylene oxide per mole of the dinonyl phenol.

EXAMPLE I

A test was made in a well in Chalk Field, near Forsan, Tex. The well was of an open hole type completion and had a depth of 1,681 feet.

One hundred sixty-five gallons of the above formulation, diluted with 165 gallons of water, were pumped down the annulus and displaced in the tubing. The well was then shut in for twelve hours. At the end of the twelve-hour shut-in period, the well was allowed to circulate for twenty hours. The well was then flushed with fifteen barrels of 1% hydrochloric acid. The well was allowed to circulate for two hours and then put back on production.

Two weeks prior to this treatment, the well owner had tried unsuccessfully to pull the pump from the well. Three days after this treatment, the pump, rods, and tubing were pulled. There was a slight trace of calcium sulfate detectable in the first five joints of tubing. The last time the rods, tubing and pump were pulled on this well (before this treatment), thirty-one strands of the tubing, the pump, and one-half of the rods had to be discarded because of gyp scale accumulation.

EXAMPLE II

The location of this test was a water injection project in the South Cowden Field near Odessa, Tex. This use was to remove the scale from a sump that consisted of a ten-inch diameter pipe thirty feet in depth.

In this treatment, one 55-gallon drum of the above formulation was used to remove scale from the sump. This was a gypsum scale and varied in thickness from about ½" to 1". It coated the entire periphery of the inside of the pipe for almost the entire depth of thirty feet. The formulation was pumped from the 55-gallon drum with a small, hand operated pump and allowed to flow over the inside periphery of the pipe and scale. The solvent action of the product was such that the scale sloughed off the sides of the sump and was washed out by flushing the sump with water. The entire operation was performed over a period of approximately three hours.

EXAMPLE III

This example was conducted in a well near Orla, Tex., which was an open hole type of well drilled to a depth of 3,300 feet.

Prior to the treatment with the above formulation, this well was producing thirty-seven barrels of water and fifteen barrels of oil per week with production declining slowly each week.

One hundred sixty-five gallons of concentrated formulation was pumped down the annulus, allowed to remain for three hours, and then circulated for twenty-four hours. Fifteen barrels of 1% hydrochloric acid was added and the well was allowed to circulate for four hours before being put back on production.

After this treatment, the well produced twenty-two barrels of oil and twenty-six barrels of water per day and production had not declined in three months following the treatment.

EXAMPLE IV

This example likewise was conducted in a well near Orla, Tex., in a well which had lateral perforations from the well into a formation and had a depth of 2,551 feet.

Prior to this treatment, the well was producing twelve barrels of water per day. Fifty-five gallons of the concentrated formulation was pumped down the annulus and allowed to remain for six hours. The well was then circulated for twenty-four hours. Fifty-five more gallons of the formulation was added and the well was allowed to circulate for an additional twelve hours. Then thirty barrels of 1% hydrochloric acid was pumped into the well. The well was allowed to circulate for four hours and then put back on production.

After the above treatment, the well was found to be producing sixty barrels of water and nine barrels of oil per day.

EXAMPLE V

This example was conducted in a pipe line at Buckeye, N. Mex.

Approximately two miles of four-inch surface line was treated with twelve drums of the above formulation diluted with twenty-five barrels of fresh water. The formulation was displaced into the line, allowed to remain for twelve hours, and then pumped out.

The displacement of the four-inch line was sixty barrels when the line was new. Due to gyp scale accumulation, the displacement was thirty-seven barrels just prior to the above treatment, the displacement in the line was again sixty barrels.

A series of tests were conducted to determine the mineral dissolving ability of the compositions disclosed herein as a function of certain variables such as type of salt, concentration of salt, effect of acid and base catalysts in the formulations, temperature, etc. The results of the test are given in the tables of the examples below. In all cases, the testing was conducted with a special synthetic scale formulated from the dihydrated form of calcium sulfate. Tests made on "gyp-rock" obtained from a commercial quarry appeared to give almost identical results to those obtained with the "synthetic scale." Unless otherwise indicated in the examples, all testing was done using a one-gram sample of the prepared gypsum scale, in cubic form, in fifty milliliters of the particular test solution at a temperature of approximately 75° F.

EXAMPLE VI

In this example which demonstrates the effect of temperature and concentration, the formulation used in Examples I–V was employed. The visual results of the tests of this example indicate that (1) there is a greater solubility of the "gyp scale" at higher temperatures, (2) there appears to be a very definite dissolving action on the scale at higher temperatures, while at lower temperatures, using the same solid to liquid ratio, the action appears to be one principally of physical disintegration of the sample, (3) fresh water appeared to have little or no effect on the formation being treated under the test conditions.

The action of the formulation appears to follow a three-stage pattern. The first stage to be seen is the apparent absorption of the fluid by the formation being treated. This results in an apparent swelling or enlargement of the formation with the appearance of voids between the crystal layers.

The second stage involves the breaking apart of the crystal and/or sluffing off of portions of the crystals of the formation being treated, resulting in the complete dissociation of any semblance of a micro-crystalline form.

The third stage is the apparent partial dissolving of the gypsum by the formulation. Varying degrees of the first stage will occur with a volume of the formation that is less than that of the scale. Through the dissociation or first two stages, the action appears to occur with any volume of the formulation in excess of that of the crystal. At a volume range of approximately thirty times the volume of the crystal, the third stage, or the dissolving of the crystal, comes in with a more pronounced effect.

The physical appearance of the dissociated material taken from different concentrations of the formulation indicates the effectiveness of the formulation in dissociation and/or dissolving of the gyp scale. The data is shown in Table 1 below.

TABLE 1

(Effect of Concentration and Temperature of the Formulation on the Amount of Calcium and Sulfate Ions Retained in Solution)

| Test No. | Temperature of test (° F.) | Solvent (ml.) | | Calcium (Ca++) and sulfate (SO$_4$) content (p.p.m.) in solvent after exposure period | | | |
|---|---|---|---|---|---|---|---|
| | | Fresh water | Preferred formulation 50% active in fresh water | 4 hours | | 50 hours | |
| | | | | Ca++ | SO$_4$ | Ca++ | SO$_4$ |
| 1 | 175 | 50 | | 400 | 2,950 | 560 | 3,750 |
| 3 | 175 | | 50 | 3,150 | 14,250 | 6,420 | 29,500 |
| 5 | 175 | 100 | | 400 | 3,000 | 560 | 3,750 |
| 7 | 175 | | 100 | 1,600 | 7,130 | 3,200 | 14,700 |
| 9 | 175 | 200 | | 400 | 2,900 | 560 | 3,750 |
| 11 | 175 | | 200 | 800 | 3,530 | 1,680 | 7,750 |
| 2 | 75 | 50 | | 400 | 3,000 | 420 | 3,050 |
| 4 | 75 | | 50 | 1,650 | 13,250 | 2,000 | 14,200 |
| 6 | 75 | 100 | | 400 | 3,000 | 400 | 3,000 |
| 8 | 75 | | 100 | 840 | 6,700 | 980 | 7,200 |
| 10 | 75 | 200 | | 400 | 3,000 | 400 | 3,000 |
| 12 | 75 | | 200 | 440 | 3,200 | 480 | 3,560 |

It is to be noted that in test No. 1, 5, 9, 2, 6 and 10, the sample being treated appeared uneffected in physical appearance by the fresh water in which it was immersed. In test No. 4, 8 and 12, the sample was completely dissociated; and in test No. 3, 7 and 11, the sample appeared to be almost completely dissolved.

EXAMPLE VII

This example demonstrates the effect of varying amounts of potassium glycolate containing various amounts of acid and base catalysts. Data from the test are shown in Table 2 below.

TABLE 2.—EFFECT OF VARYING AMOUNTS OF POTASSIUM GLYCOLATE WITH ACID AND BASE CATALSYTS PRESENT

Formula Composition (Percent by Weight)

| Potassium glycolate | Other | | Water | Relative action on scale [1] | Exposure time (hrs.) at 75° F. |
|---|---|---|---|---|---|
| 34.5 | Glycolic acid | 13.5 | 52 | 7 | 8 |
| 42 | Potassium hydroxide. | 16 | 42 | 10 | 8 |
| 42 | do | 20 | 32 | 9 | 8 |
| 32.5 | do | 8.5 | 59 | 7 | 24 |
| 32.5 | do | 18.5 | 49 | 10 | 12 |
| 32.5 | do | 28.5 | 39 | 10 | 12 |
| 21 | do | 13 | 66 | 10 | 18 |
| 21 | do | 23 | 56 | 10 | 18 |
| 21 | do | 33 | 46 | 6 | 18 |
| 10.5 | do | 6.5 | 83 | 10 | 24 |
| 10.5 | do | 16.5 | 73 | 1 | 24 |
| 10.5 | do | 26.5 | 63 | 1 | 42 |

[1] The number "0" indicates about the same effect as distilled water. The number "10" indicates visible dissolving action. The number "9" indicates complete disintegration of the scale. The numbers between "0" and "9" indicate varying degrees of disintegration as herein defined.

EXAMPLE III

This example demonstrates the effect of varying the amount of the preferred acid catalyst, sulfamic acid, in a potassium glycolate formulation. The data are shown in Table 3 below.

TABLE 3
(Effect of Varying Amounts of Sulfamic Acid)
Formula Composition (Percent by Weight)

| Potassium glycolate | Sulfamic acid | Water | Relative action on scale at various exposure periods [1] | | | | | | | |
|---|---|---|---|---|---|---|---|---|---|---|
| | | | Minutes | | | Hours | | | | |
| | | | 15 | 30 | 45 | 1 | 2 | 3 | 4 | 6 |
| 60 | 0.0 | 40 | 5 | 6 | 6 | 7 | 8 | 9 | 9 | 10 |
| 60 | 0.5 | 39.5 | 5 | 5 | 7 | 8 | 9 | 9 | 9 | 10 |
| 60 | 1.0 | 39 | 5 | 7 | 7 | 7 | 8 | 9 | 10 | |
| 60 | 1.5 | 38.5 | 5 | 7 | 8 | 8 | 8 | 9 | 10 | |
| 60 | 2.0 | 38 | 6 | 8 | 8 | 8 | 9 | 10 | | |
| 60 | 2.5 | 37.5 | 6 | 8 | 8 | 8 | 9 | 10 | | |
| 60 | 3.0 | 37 | 8 | 8 | 9 | 10 | | | | |
| 60 | 3.5 | 36.5 | 8 | 9 | 9 | 10 | | | | |
| 60 | 4.0 | 36 | 8 | 9 | 9 | 10 | | | | |
| 60 | 5.0 | 35 | 9 | 9 | 9 | 10 | | | | |
| 60 | 6.0 | 34 | 9 | 9 | 10 | | | | | |
| 60 | 7.0 | 33 | 9 | 9 | 10 | | | | | |
| 60 | 8.0 | 32 | 9 | 9 | 10 | | | | | |
| 60 | [2] 10.0 | 30 | 9 | 10 | | | | | | |
| 60 | [2] 15.0 | 25 | 9 | 10 | | | | | | |

[1] The number "0" indicates about the same effect as distilled water. The number "10" indicates visible dissolving action. The number "9" indicates complete disintegration of the scale. The numbers between "0" and "9" indicate varying degrees of disintegration as herein defined.

[2] Careful consideration for solubility must be exhibited for there is a definite gel-forming tendency observed for the higher concentrations of sulfamic acid.

EXAMPLE IX

This example demonstrates the relative action of certain individual components used to make the compositions herein. Also shown by this example is the effect of mixtures of potassium hydroxide, sulfamic acid and water on the gyp scale. The data are shown in Table 4 below.

TABLE 4
(Effect of Individual Components and Certain Mixtures Thereof)
Formula Composition (Percent by Weight)

| Glycolic acid | Potassium hydroxide | Sulfamic acid | Water | Relative action on "scale" at exposure time of 168 hrs. at 75° F. |
|---|---|---|---|---|
| 70 | 0 | 0 | 30 | 0 |
| 28 | 0 | 0 | 72 | 0 |
| 0 | 30 | 0 | 70 | 0 |
| 0 | 0 | 40 | 60 | 0 |
| 0 | 2 | 3.4 | 94.6 | 0 |
| 0 | 2.9 | 5.0 | 91.0 | 0 |
| 0 | 7 | 10.0 | 83.0 | 1 |
| 0 | 10 | 15.0 | 75.0 | 2 |
| 0 | 15 | 15 | 70 | 1 |
| 0 | 16 | 16 | 64 | 1 |

As clearly seen from Table 4, neither glycolic acid, potassium hydroxide, nor sulfamic acid alone are effective for disintegration and/or dissolving the "gyp-rock." As also seen, various combinations of potassium hydroxide, sulfamic acid, and water are not effective as solvents for the "gyp-rock."

EXAMPLE X

This example shows the effectiveness of salts other than the preferred potassium glycolate salt on dissolving the "gyp-scale." The data are shown in Table 5 below. Also shown in Table 5 is the effect of certain acid and base catalysts in conjunction with certain of the salts.

TABLE 5
(Effect of Salts Other Than Potassium Glycolate)
Formula Composition (Percent by Weight)

| Salt | | Other | | Sulfamic acid | Water | Relative action on "scale" at various exposure times in hours at 75° F.[1] | | | | |
|---|---|---|---|---|---|---|---|---|---|---|
| | | | | | | 1 | 3 | 6 | 24 | 36 |
| Potassium acetate | 49 | | | 3.4 | 47.6 | 1 | 1 | 2 | 4 | 5 |
| Potassium adipate | 30.4 | | | 3.4 | 66.2 | 1 | 2 | 2 | 4 | 4 |
| Potassium acrylate | 30.5 | | | 3.4 | 66.1 | 4 | 5 | 5 | 7 | 8 |
| Potassium butyrate | 49.7 | Butyric acid | 5.3 | 3.4 | 41.6 | 1 | 1 | 1 | 3 | 3 |
| Potassium citrate | 39.4 | Citric acid | 5.0 | 3.4 | 52.2 | 9 | 9 | 10 | | |
| Potassium chloroacetate | 28.1 | | | 3.4 | 68.5 | 6 | 7 | 8 | 8 | 8 |
| Potassium 2,4-dihydroxy benzoate | 18.7 | | | 3.4 | 74.5 | 1 | 1 | 1 | 5 | 5 |
| Potassium dithioloxalate | 6.4 | | | 3.4 | 90.2 | 1 | 3 | 3 | 3 | 3 |
| Potassium formate | 54.7 | | | 3.4 | 42.9 | 5 | 7 | 9 | 9 | 9 |
| Potassium p-hydroxy benzoate | 51.5 | | | 3.4 | 45.1 | 6 | 8 | 9 | 9 | 9 |
| Potassium lactate | 51.5 | | | 3.4 | 45.1 | 9 | 10 | | | |
| Potassium laurate | 23.8 | | | 3.4 | 72.9 | 4 | 5 | 6 | 6 | 6 |
| Potassium oxalate | 32.1 | | | 3.4 | 64.5 | 5 | 6 | 7 | 7 | 7 |
| Potassium terephthalate | 21.8 | | | 3.4 | 74.8 | 2 | 3 | 4 | 7 | 7 |
| Ammonium glycolate | 15.1 | Glycolic acid | 45.4 | 3.4 | 36.1 | | 4 | 8 | 10 | |
| Sodium glycolate | 38 | | | 3.4 | 58.6 | | 7 | 10 | | |
| Do | 27 | Sodium hydroxide | 15.2 | 3.4 | 54.4 | | 7 | 10 | | |
| Lithium glycolate | 32 | Lithium hydroxide | 18.1 | 3.4 | 46.5 | | 1 | 4 | 6 | 6 |
| Mono-methyl amine salt of glycolic acid | 57 | | | 3.4 | 39.6 | | 3 | 7 | 7 | 9 |
| Do | 59 | | | 3.4 | 37.6 | | 2 | 6 | 7 | 7 |
| Calcium glycolate | 8.7 | | | 3.4 | 87.9 | | 1 | 3 | 4 | 6 |
| Potassium glycolate | 50 | | | 3.4 | 46.6 | | [2] 10 | | | |

[1] The number "0" indicates about the same effect as distilled water. The number "10" indicates visible dissolving action. The number "9" indicates complete disintegration of the scale. The numbers between "0" and "9" indicate varying degrees of disintegration as herein defined.

[2] This sample appeared to be completely disassociated in about one hour of exposure time.

EXAMPLE XI

This example demonstrates the effectiveness of using other salts mixed with the preferred potassium glycolate. The data from these tests are shown in Table 6 below.

TABLE 6
(Effect of Mixed Salts in the Formulation)
Formula Composition (Percent by Weight)

| Salt | | Potassium glycolate | Other | | Water | Relative action on "scale" at various exposure periods at 75° F. | | | | | | |
|---|---|---|---|---|---|---|---|---|---|---|---|---|
| | | | | | | Minutes | | | | Hours | | |
| | | | | | | 2 | 4 | 10 | 15 | 1 | 2 | 6 |
| Potassium acetate | 3.4 | 45.6 | | | 51 | 2 | 4 | 6 | 7 | 10 | | |
| Potassium chloroacetate | 4.8 | 45.6 | | | 49.6 | 2 | 5 | 7 | 8 | 10 | | |
| Potassium dithioloxalate | 5.7 | 45.6 | | | 48.7 | 2 | 4 | 7 | 8 | 10 | | |
| Potassium p-hydroxy benzoate | 3.1 | 45.6 | Potassium hydroxide | 1 | 50.3 | 2 | 4 | 7 | 8 | 10 | | |
| Potassium o-nitrobenzoate | 3.6 | 45.6 | do | 1 | 49.8 | 1 | 3 | 5 | 6 | 9 | 10 | |
| Potassium sulfanilate | 4.1 | 45.6 | do | 1 | 49.3 | 1 | 4 | 5 | 5 | 9 | 10 | |

EXAMPLE XII

This example demonstrates the relative effect of hydrochloric acid vs. sulfamic acid over a broad concentration range wherein potassium glycolate is the salt used in the formulation. That data is shown in Table 7 below.

TABLE 7

(Effect of Using Hydrochloric Acid Versus Sulfamic Acid in Formulation)
Formula Composition (Percent by Weight)

| Potassium glycolate | Water | Hydrochloric acid (37%) | Sulfamic acid | Relative action on "scale" at various exposure periods at 75° F. | | | |
|---|---|---|---|---|---|---|---|
| | | | | Minutes | | | Hours |
| | | | | 15 | 30 | 45 | 1 |
| 60 | 35 | | 5 | 8 | 9 | 9 | 10 |
| 60 | 35 | 5 | | 8 | 9 | 9 | 10 |
| 60 | 30 | | 10 | 9 | 10 | | |
| 60 | 25 | | 15 | 9 | 10 | | |
| 60 | 25 | 15 | | 9 | 10 | | |
| 60¹ | 20 | | 20 | | | | |
| 60¹ | 20 | 20 | | | | | |

¹ Formed a gel.

As the above examples clearly demonstrate, the compositions of the present invention are extremely effective in the removal and/or disintegration of mineral deposits such as gyp scale and the like from oil and gas well equipment, cooling towers and other industrial equipment subject to fouling from buildups of such deposits. While such deposits usually contain primarily gypsum, other materials such as magnesium silicates, iron sulfides, calcium carbonates, etc. may also be present. The compositions herein are effective in removing deposits containing such other materials as well.

I claim:
1. A method for the removal of gypsum scale comprising contacting said scale with a composition consisting essentially of from about 5% to about 85% by weight of a salt of an alkali metal hydroxide and glycolic acid, from about 95% to about 15% by weight water, and from about 0.5% by weight to about 15% by weight of an acid selected from the group consisting of sulfamic acid, hydrochloric acid, o-nitrobenzoic acid, phosphoric acid, sulfanilic acid, sulfuric acid, sulfurous acid, butyric acid, citric acid, glycolic acid and mixtures thereof.

2. The method of claim 1 wherein said salt is present in an amount of from about 5% to about 50% by weight, and said water is present in an amount of from about 95% to about 50% by weight.

3. The method of claim 1 wherein said alkali metal hydroxide is potassium hydroxide.

4. The method of claim 1 wherein said acid is sulfamic acid.

5. The method of claim 4 wherein said alkali metal hydroxide is potassium hydroxide.

6. The method of claim 1 wherein said composition contains an effective amount of a wetting agent.

7. The method of claim 6 wherein said wetting agent is present in an amount of from about 0.1% to about 3% by weight.

References Cited

UNITED STATES PATENTS

| | | | |
|---|---|---|---|
| 1,873,083 | 8/1932 | Walker | 252—8.55 B |
| 2,584,017 | 1/1952 | Dvorkovitz et al. | 252—156 |
| 2,877,848 | 3/1959 | Case | 252—8.55 B |
| 2,225,294 | 12/1940 | Bolton et al. | 252—8.55 C |
| 2,124,530 | 7/1938 | Loomis et al. | 252—8.55 C |
| 2,217,676 | 10/1940 | Fry | 252—8.55 C |
| 2,386,605 | 10/1945 | Harton et al. | 252—8.55 B |
| 2,640,810 | 6/1953 | Cardwell et al. | 252—8.55 C |
| 3,170,815 | 2/1965 | White | 252—8.55 B |
| 3,510,351 | 5/1970 | Dillen et al. | 252—82 X |

HERBERT B. GUYNN, Primary Examiner

U.S. Cl. X.R.

166—312; 252—8.55 B, 8.55 C, 82, 86